(12) United States Patent
Leverger et al.

(10) Patent No.: US 9,963,087 B2
(45) Date of Patent: May 8, 2018

(54) FASTENER COMPRISING A SNAP-ENGAGEMENT FOOT TO PUSH THROUGH A HOLE IN A PANEL AND AN ENGAGEMENT HEAD CONFIGURED TO JUT OVER SAID PANEL

(71) Applicant: ILLINOIS TOOL WORKS INC., Glenview, IL (US)

(72) Inventors: Eric Leverger, Epone (FR); Laurent Huet, Meru (FR); Rachid Idjakiren, Beauchamp (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 428 days.

(21) Appl. No.: 14/403,262

(22) PCT Filed: Apr. 30, 2013

(86) PCT No.: PCT/IB2013/000803
§ 371 (c)(1),
(2) Date: Nov. 24, 2014

(87) PCT Pub. No.: WO2013/179110
PCT Pub. Date: Dec. 5, 2013

(65) Prior Publication Data
US 2015/0135484 A1    May 21, 2015

(30) Foreign Application Priority Data
Jun. 1, 2012 (FR) ...................................... 12 55136

(51) Int. Cl.
*B60R 13/02* (2006.01)
*F16B 21/08* (2006.01)
(Continued)

(52) U.S. Cl.
CPC ........ *B60R 13/0206* (2013.01); *F16B 13/045* (2013.01); *F16B 21/086* (2013.01); *F16B 5/0657* (2013.01); *Y10T 24/303* (2015.01)

(58) Field of Classification Search
CPC .. B60R 13/0206; F16B 13/045; F16B 21/086; F16B 5/0657; F16B 5/065;
(Continued)

(56) References Cited

U.S. PATENT DOCUMENTS 3,230,592 A  *  1/1966  Hosea ...................... B60J 10/30
                                                          24/297
5,651,634 A       7/1997  Kraus
(Continued)

FOREIGN PATENT DOCUMENTS

CN    1142019 A    2/1997
CN    1144176 A    3/1997
(Continued)

OTHER PUBLICATIONS

ISR for PCT/IB2013/000803 dated Jul. 29, 2013.

*Primary Examiner* — Jack W Lavinder
(74) *Attorney, Agent, or Firm* — Hauptman Ham, LLP (57) ABSTRACT

The invention concerns a fastener comprising a head and a foot comprising a rigid core and three curved flexible wings each joining said rigid core along one side, having opposite a face of said core an inside surface bordered by a longitudinal edge and by a transverse edge, and having an outside surface respectively tapering towards a pointed end which is an opposite end to said head and towards said transverse edge, on respective opposite sides of an inflection plane, each said wing being configured to bend by elastic deformation towards said core; said core comprising a hub and three small walls extending radially from said hub, whereby said core is star-shaped in cross-section; and said inside surface of each said wing is bordered by a said respective (Continued)

small wall which is remotely opposite said longitudinal edge.

33 Claims, 8 Drawing Sheets

(51) Int. Cl.
 *F16B 13/04* (2006.01)
 *F16B 5/06* (2006.01)
(58) Field of Classification Search
 CPC ................ Y10T 24/303; Y10T 24/309; Y10T 403/7176; Y10S 411/908; B62D 25/24
 USPC ................................................ 411/508–510
 See application file for complete search history.

(56) References Cited

U.S. PATENT DOCUMENTS

| | | |
|---|---|---|
| 5,658,110 A | 8/1997 | Kraus |
| 6,305,055 B1 | 10/2001 | Castro |
| 2005/0244250 A1 | 11/2005 | Okada et al. |
| 2006/0000064 A1 | 1/2006 | Leverger et al. |
| 2008/0089741 A1 | 4/2008 | Legat et al. |
| 2009/0022567 A1 | 1/2009 | Huet |
| 2010/0322743 A1 | 12/2010 | Ostergren |
| 2012/0131770 A1 | 5/2012 | Iwahara et al. |

FOREIGN PATENT DOCUMENTS

| | | |
|---|---|---|
| CN | 101228358 A | 7/2008 |
| EP | 0726400 A1 | 8/1996 |
| EP | 0726401 A1 | 8/1996 |
| EP | 2458230 A1 | 5/2012 |
| FR | 2789454 A1 | 8/2000 |
| FR | 2789455 A1 | 8/2000 |
| FR | 2872556 A1 | 1/2006 |
| FR | 2872566 A1 | 1/2006 |
| FR | 2898164 A1 | 9/2007 |
| WO | 2006050774 A1 | 5/2006 |
| WO | 2009008824 A1 | 1/2009 |

\* cited by examiner

FASTENER COMPRISING A SNAP-ENGAGEMENT FOOT TO PUSH THROUGH A HOLE IN A PANEL AND AN ENGAGEMENT HEAD CONFIGURED TO JUT OVER SAID PANEL

RELATED APPLICATIONS

The present application is a National Phase of International Application Number PCT/IB2013/000803 filed Apr. 30, 2013 which claims priority to French Application Number 1255136 filed Jun. 1, 2012.

The invention generally concerns fasteners for fastening a member to a panel such as a car body sheet metal panel.

It is known that such fasteners exist which, for their fastening, are provided with a snap-engagement foot for pushing through a hole of predetermined diameter in the panel.

Such a fastener is known in particular from French patent applications FR 2 789 454 and FR 2 789 455 which is provided with an engagement head and a snap-engagement foot comprising a flat rigid core and two curved flexible wings.

This fastener is of plastics material molded as a single piece.

The flat rigid core has two longitudinal edges converging towards a pointed end while, by its other end, it is connected to the rest of the fastener.

Each wing is connected to that core along one of the two longitudinal edges of the core and has, facing a respective planar face of the core, an inside surface bordered by that planar face, by a longitudinal edge of that wing and by a transverse edge of that wing.

The outside surface of the foot tapers respectively towards the free end and towards the transverse edge of the wings, on each side of an inflection plane that is transversely oriented to the axial direction of the foot.

This outside surface of the foot has, at the inflection plane, a generally oval shape of which the small width is located along the axial plane that is transversely oriented to the median axial plane of the core.

To enable snap engagement of the foot in the hole, each wing is adapted to flex by elastic deformation towards the planar face of the core which faces its inside surface.

The inside surface of each wing is concave and the longitudinal edge of each wing has, viewed by an observer situated parallel to the planar face of the core which faces its inside surface, a V-shape of which the point, which is directed outwardly, is located at the inflection plane on each side of which the outside surface of the foot tapers.

Such a fastener is greatly appreciated since it makes it possible to minimize the force required to introduce the foot into the hole in the panel and to maximize the retaining force given by the snap-engagement foot to prevent extraction of the fastener from the panel.

The invention is directed to providing a fastener of the same type but with improved performance in terms of resistance to the extraction forces exerted on it, while being particularly simple and convenient both with regard to its manufacture and its use.

The invention thus relates to a fastener comprising a snap-engagement foot configured to be pushed axially through a hole in a panel and an engagement head configured to jut over said panel when said snap-engagement foot is pushed into said hole, which snap-engagement foot comprises a rigid core and two curved flexible wings each connected to said rigid core along one side, each said curved flexible wing having, opposite a face of said core, an inside surface bordered by a longitudinal edge of said wing and by a transverse edge of said wing in face-to-face relationship with said engagement head; said snap-engagement foot having an outside surface tapering respectively towards a pointed end that is an opposite end to said engagement head and towards said transverse edge of each said wing, on respective opposite sides of an inflection plane oriented transversely to the axial direction of said snap-engagement foot; each said curved flexible wing being configured to bend by elastic deformation towards said rigid core to enable the snap engagement of said foot into said hole; characterized in that said rigid core comprises a hub and three small walls extending radially from said hub, whereby said rigid core is star-shaped in cross-section; and said fastener further comprises a third curved flexible wing similar to the other two curved flexible wings, said inside surface of each said curved flexible wing being furthermore bordered by a said respective small wall which is remotely opposite said longitudinal edge of said wing.

Whereas in the fastener of the prior art described above, the rigid core is flat and has two end edges, in the fastener according to the invention, the rigid core is star-shaped with at least three small walls each radially oriented such that the rigid core has at least three end edges.

Each of the wings of the fastener according to the invention extends from one of the small walls of the core.

Of course, the star-shaped rigid core may be provided with more than three radial arms, in other words with more than three small walls extending from the central hub of the core, and consequently the fastener may comprise more than three wings each extending from such a small wall.

It should be noted that to oppose such an extraction force, the fastener according to the invention acts on the panel by at least three wings rather than by two wings. The pressure experienced by the panel is thus locally less than with the earlier fastener and consequently, the risks of deformation of the panel are reduced. The fastener according to the invention may thus be used with relatively thin sheet metal.

Furthermore, the deformation of the snap-engagement foot is distributed over at least three wings rather than over two wings. Consequently, the stresses experienced by each of the wings are relatively moderate. The risk of degradation of these wings is thus limited.

It will be noted lastly that with a snap-engagement foot comprising at least three rigid small walls, the wedging action relative to the hole in the panel is better distributed than with a flat rigid core.

According to preferred, simple, convenient and economical features of the fastener according to the invention, said small walls are regularly spaced around a periphery of said hub.

The fact that the three or more small walls are regularly distributed around the periphery of the hub enables the fastener according to the invention to be stabilized relative to the periphery of the hole in the panel.

According to other preferred, simple, convenient and economical features of the fastener according to the invention:

said snap-engagement foot has at least one rim extending radially at the location of an end of a said small wall opposite said engagement head and at the location of said transverse edge of said curved flexible wing bordered by said small wall, said rim being configured to avoid the pushing-in of said snap-engagement foot in said hole beyond said curved flexible wings;

said engagement head is configured to be pushed axially through a key-hole shaped opening in a trim member and is provided with a flange, with a plate configured to avoid the pushing-in of said engagement head into said opening beyond said plate, with a shank interposed between said flange and said plate and defining a space configured to receive said trim member, and a collar, said plate being interposed between said collar and said shank;

said engagement head further comprises an anchorage face at an opposite end to said flange, which anchorage face is surrounded by said insert of said engagement head;

said at least one rim is provided with a cut-out at an end of said rim that is an opposite end to said small wall from which said rim extends;

said snap-engagement foot comprises the same number of said rims as the number of said wings or said small walls, and each said rim has a said cut-out and said cut-outs are of different lengths;

said hub of said rigid core has an inside face which is of cylindrical shape; and/or said hub of said rigid core has an inside face which is prism-shaped.

According to other preferred, simple, convenient and economical features of the fastener according to the invention, said engagement head is provided with an insert and said fastener comprises a first part formed from said snap-engagement foot and from said insert, which insert is made as a single part with said snap-engagement foot, and a second part formed from the remainder of said engagement head, which second part is overmolded onto said insert, said insert forming an extension to said snap-engagement foot without overhanging any of said curved flexible wings.

The fastener according to the invention thus comprises a first part formed from the snap-engagement foot and from the insert of the engagement head and a second part formed from the rest of the engagement head. After molding of the first part, the second part is overmolded onto the first part and more particularly over the insert to form the one-piece fastener comprising the snap-engagement foot and the engagement head.

It is to be noted that once molded, the first part is axially ejected by molding components which at that time are located interposed between the core and the inside of the wings.

The manufacture of the fastener in two steps according to the invention enables such molding of the inside of the wings in a simple and convenient manner since there is nothing to hinder either the molding of the wings or the removal from the mold (or ejection) of the first part, not even the insert of that first part by which the manufacture is possible since that insert overhands no curved flexible wing.

The manufacture of such a fastener is thus particularly convenient and furthermore makes it possible to produce, if desired, the first part and the second part with different or similar mechanical characteristics, for example in terms of hardness and/or flexibility, which characteristics confer upon that fastener ease of insertion into the hole in the panel, maintenance in that hole and resistance to pulling out.

By virtue of these features, it is possible to obtain that each wing deforms as well as possible, while requiring, to flex towards the core, a moderate pushing-in force of the snap-engagement foot, while giving, when it relaxes elastically, excellent restitution of the energy stored during the pushing-in, whereby it is possible to obtain high resistance to pulling out of the snap-engagement foot.

According to still other preferred, simple, convenient and economical features of the fastener according to the invention:

said first part is formed from a first plastics material and said second part is formed from a second plastics material different from said first plastic;

said insert projects from said rigid core;

said insert is in the form of a hollow mast provided with at least one notch opening at a free end of said hollow mast;

said insert is provided with a retaining plug formed at the location of said free end of said hollow mast to obturate at least partially said hollow mast and said at least one notch; and/or said insert has at least one reinforcing arm extending transversely to the axial direction of said snap-engagement foot, which reinforcing arm is enveloped by said second part of said fastener.

According to features of a simple, convenient and economical variant of the fastener according to the invention, said hub comprises a flat face facing each curved wing, each said small wall comprising between its end edge and said hub a straight outside wall in line with a said flat face of said hub, each said face of said rigid core faced by a said wing being flat and formed by a said flat face of said hub and a said straight outside face of a said small wall.

These features facilitate the molding of the fastener according to the invention, in particular thanks to the possibility of using slides in the mold, each being movable in a direction parallel to a one of the respective flat faces of the rigid core of the foot.

According to preferred features of this variant:

the fastener is entirely formed from the same plastics material;

said engagement head is configured to be pushed axially through a key-hole shaped opening in a trim member and comprises a plate configured to avoid the pushing-in of said engagement head into said opening beyond said plate and also a collar; said collar being formed from a different plastics material from the rest of the fastener;

said plate comprises recesses for arms of the collar; and/or said recesses and said arms are grouped together in the same number of sets as there are said flexible wings, the recesses and the arms of each set being oriented in a direction parallel to one of said flat faces of said rigid core.

The disclosure of the invention will now be continued with the description of an example embodiment, given below by way of illustrative and non-limiting example, with reference to the accompanying drawings, in which.

Figure 1:
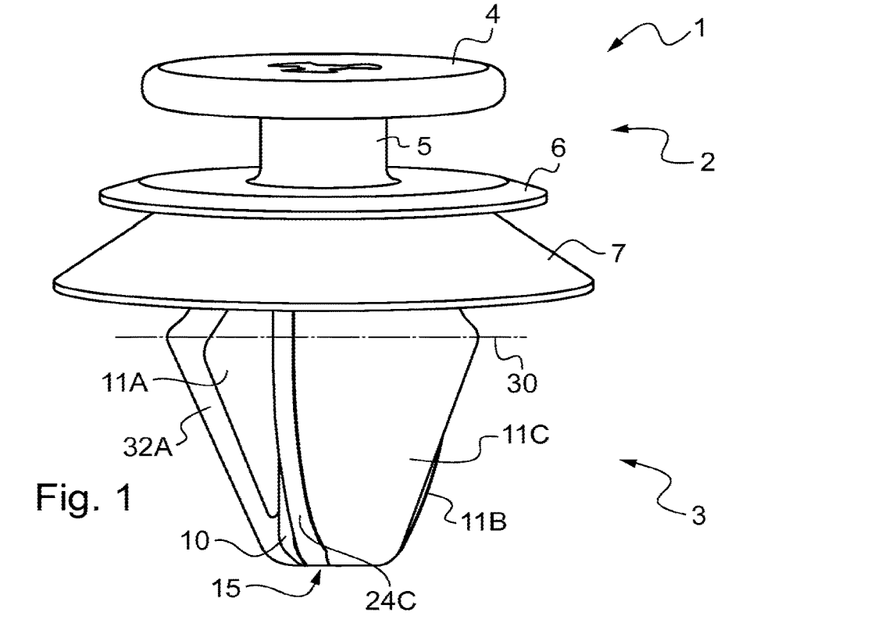
FIG. 1 is a perspective view of a fastener in accordance with the invention.

FIG. 1 illustrates a fastener 1 comprising an engagement head 2 as well as a snap-engagement foot 3.

The fastener 1 is formed from plastics material, by molding in two steps during which a first part and a second part are respectively formed.

Here, the first part is formed by the snap-engagement foot 3 and a piece of the engagement head 2, while the second part is formed by the rest of the engagement head 2.

Starting with its opposite end to the foot 3, the engagement head 2 comprises a flange 4, a shank 5, a plate 6 and a sealing collar 7, these different members being coaxial relative to each other and each being of circular general shape.

The shank 5 is interposed between the flange 4 and the plate 6, which is itself interposed between the shank 5 and the sealing collar 7.

Figure 11:
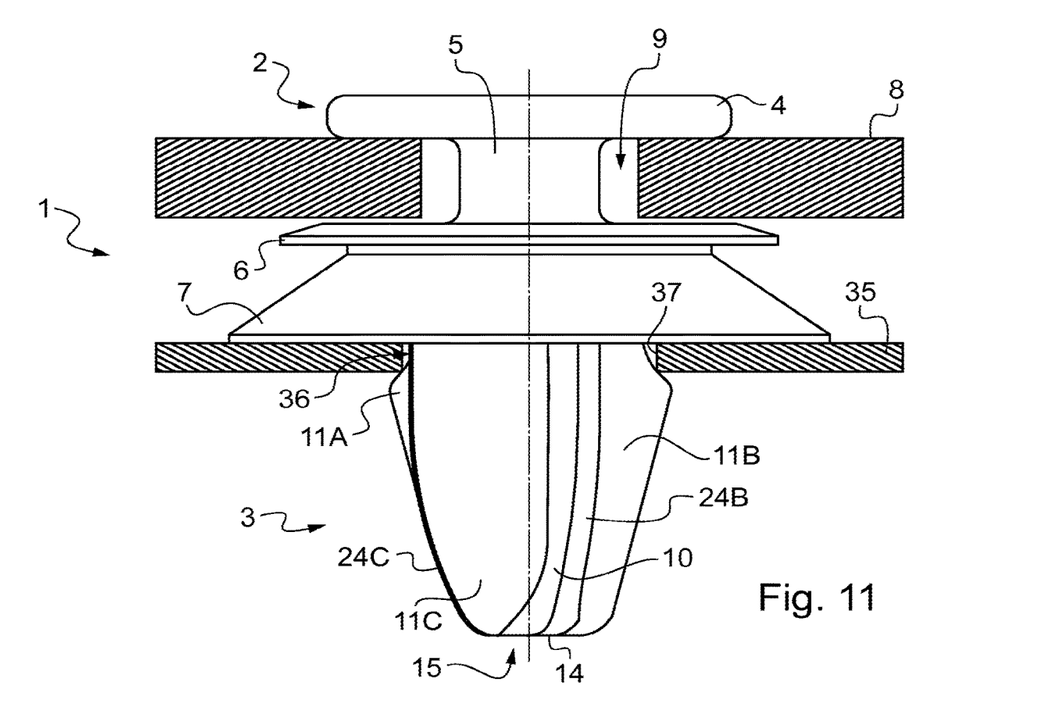
FIG. 11 is a diagrammatic plan view showing the fastener of FIG. 1 having its snap-engagement foot pushed through the hole in the panel of FIG. 10 and having an engagement head engaged in an aperture of a trim member.

The annular space located around the shank 5, between the flange 4 and the plate 6, is configured to receive a trim member 8 as shown in FIG. 11, such as a car body side embellishment having an opening in the shape of a keyhole 9 of which the round part is of a diameter corresponding to that of the flange 4 and of which the elongate portion is of width approximately corresponding to that of the shank 5.

The thickness of the wall of the member 8 in which the opening in the shape of a keyhole 9 corresponds to the spacing between the flange 4 and the plate 6.

The mounting of the trim member 8 is carried out by pushing the flange 4 through the round part of the opening in the shape of a keyhole 9 then by making the trim member 8 slide parallel to the orientation of the elongate part of the opening in the shape of a keyhole 9, such that the shank 5 engages in that elongate part.

The sealing collar 7 is conventionally of frusto-conical form and is of particularly small thickness, in any case smaller than the thickness of the flange 4 and of the plate 6.

The plate 6 consequently comprises, beyond its connection with the sealing collar 7, an extension outwardly making it possible to avoid continuation beyond the plate 6 of the pushing-in of the engagement head 2 into the round part of the opening in the shape of a keyhole 9.

The engagement head 2 further comprises a face 23 (FIG. 8) for overmolding at an opposite end 22 of the shank 5 to the flange 4.

It should be noted that the components of the engagement head 2 described above form the second part of the fastener 1.

The engagement head 2 further comprises an insert 16, also termed appendage, described below in more detail, which insert 16 does not belong to the second part of the fastener 1 but rather to the first part of that fastener 1, which first part also comprises, as indicated above, the snap-engagement foot 3 described below. This appendage or insert 16 thus forms the piece of the engagement head 2 (to be distinguished from the rest of that head) belonging to that first part of the fastener 1.

The snap-engagement foot 3 comprises a rigid core 10 and three curved flexible wings 11A, 11B and 11C each connected to that core 10 along one side.

Figure 4:
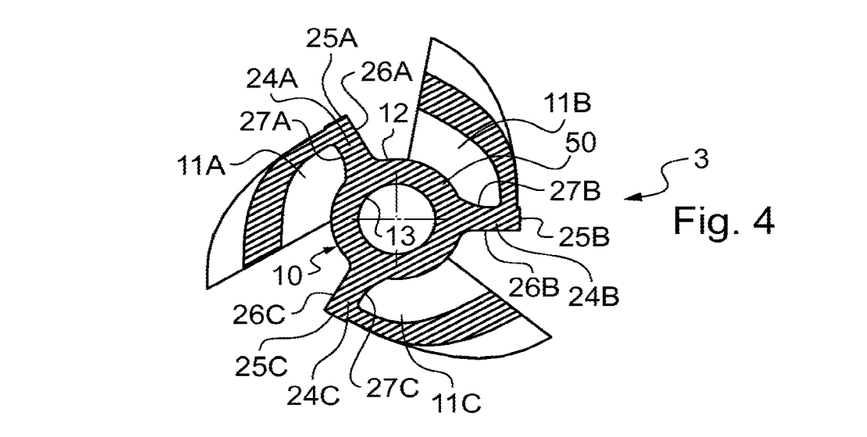
FIGS. 4 and 5 are cross-section views on IV-IV and V-V in FIG. 2.

The rigid core 10 is provided with a hollow cylindrical hub 50 having, as shown in FIG. 4, an outside face 12 of substantially cylindrical shape and an inside face 13 of cylindrical shape.

The core 10 is oriented in an axial direction and has a free end 14 which coincides with the free end 15 of the snap-engagement foot 3 which is in the form of a point here.

The core 10 is furthermore provided with three small walls 24A, 24B and 24C each extending radially from the outside face 12 of the hub 50 of that core 10. This hub 50 is thus central.

These three small walls 24A, 24B and 24C each extend between the free end 14 of the core 10 and its opposite end to that free end 14, in other words along the core 10 in its axial direction.

These small walls 24A, 24B and 24C are furthermore regularly distributed around the periphery of the outside face 12 of the hub 50 and in particular here, the three small walls 24A, 24B and 24C are offset from each other by 120°.

It will be noted that the three small walls 24A, 24B and 24C are identical.

The small walls 24A, 24B and 24C each project from the outside face 12 of the hub 50 and each has, remotely from the hub 50, an end edge 25A, 25B and 25C, which end edges are straight.

These small walls 24A, 24B and 24C furthermore each have a respective straight outside face 26A, 26B and 26C situated between the hub 50 and the respective end edge 25A, 25B and 25C; as well as a respective inside face 27A, 27B and 27C which is an opposite face to the respective outside face 26A, 26B and 26C, which inside faces 27A, 27B and 27C are slightly curved and are also situated between the hub 50 and the respective end edge 25A, 25B and 25C (FIG. 4).

It will be noted that the arrangement of the small walls 24A, 24B and 24C on the hub 50 means that the rigid core 10 is, in cross-section, star-shaped.

The wing 11A is connected to the core 10 by a small wall 24A of that core 10.

The wing 11A is directly connected to the small wall 24A along the inside wall 27A, in the vicinity of the end edge 25A.

Figure 2:
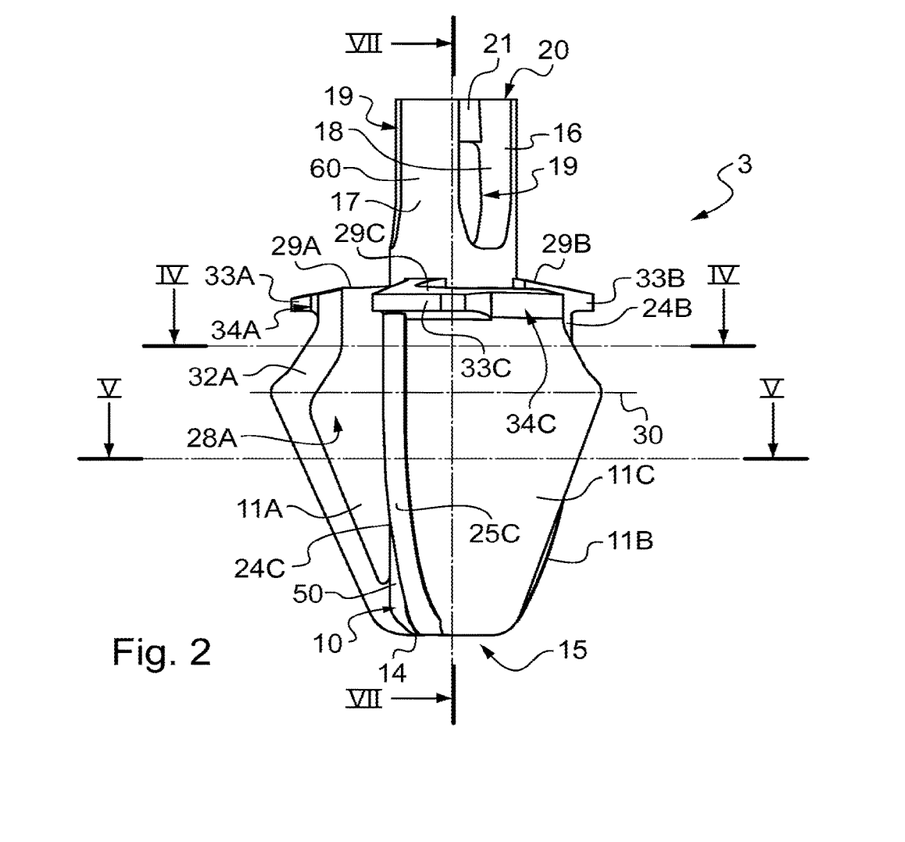
FIG. 2 is a perspective view of part of the fastener of FIG. 1, comprising a snap-engagement foot and an appendage.
Figure 3:
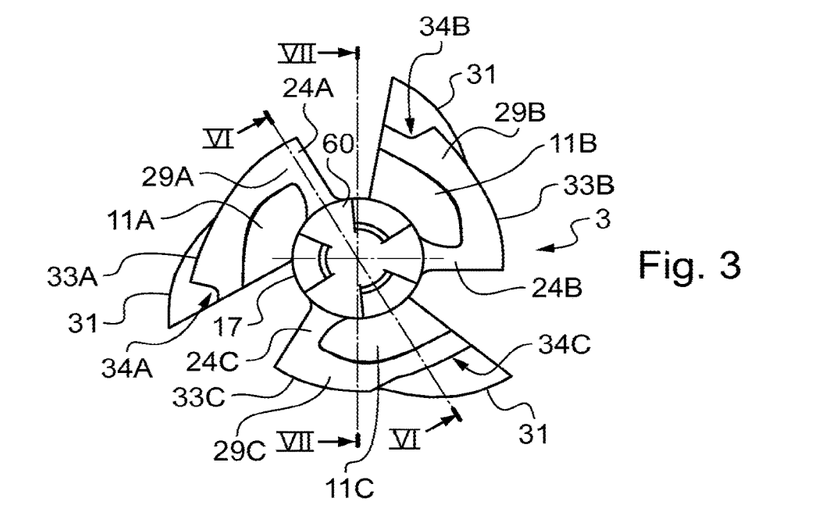
FIG. 3 is a plan view from above of the part of the fastener visible in FIG. 2.
Figure 8:
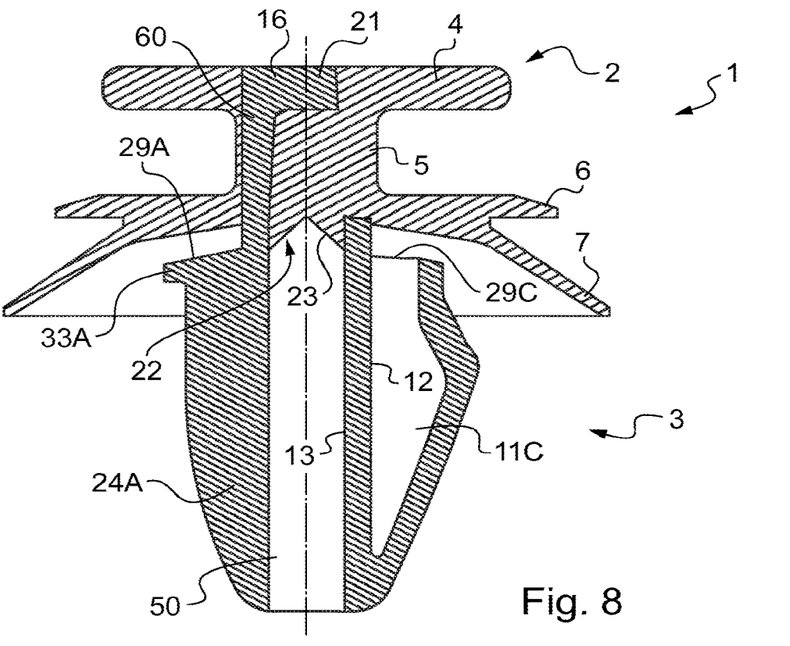
FIGS. 8 and 9 are similar views to those of FIGS. 6 and 7, showing the entirety of the fastener illustrated in FIG. 1.

The wing 11A has, facing the outside face 12 of the hub 50, an inside surface 28A bordered by a part of the inside face 27A of the small wall 24A, by a longitudinal edge 32A (FIG. 5) of that wing 11A, which longitudinal edge 32A is remote from the small wall 24A, and by a transverse edge 29A facing the plate 6 of the engagement head 2 (FIGS. 2, 3 and 8).

The inside surface 28A of the wing 11A is concave here.

The preceding description for the wing 11A also applies for the wing 11B as well as for the wing 11C, on condition of replacing the suffix A of the numerical references with the suffix B and respectively C.

However, as will be seen below, the wings 11A, 11B and 11C are not quite identical.

On each side of an inflection plane 30 (FIGS. 1 and 2) which is transversely oriented to the axial direction of the snap-engagement foot 3, the outside surface thereof tapers respectively towards the pointed end 15 and towards the transverse edges 29A, 29B and 29C respectively of the wings 11A, 11B and 11C.

It will be noted (see FIG. 2) that the outside surface of the snap-engagement foot 3 (generally defined by the end edges of the small walls and by the wings) has, on each side of the inflection plane 30, a difference in slant relative to the axial direction. To be precise, the slant relative to the axial direction of the outside surface of the snap-engagement foot 3 in the portion situated substantially between the inflection plane 30 and the transverse edges 29A, 29B and 29C is slightly greater than its slant in the portion situated substantially between that inflection plane 30 and the free end 15 of the snap-engagement foot 3.

Figure 6:
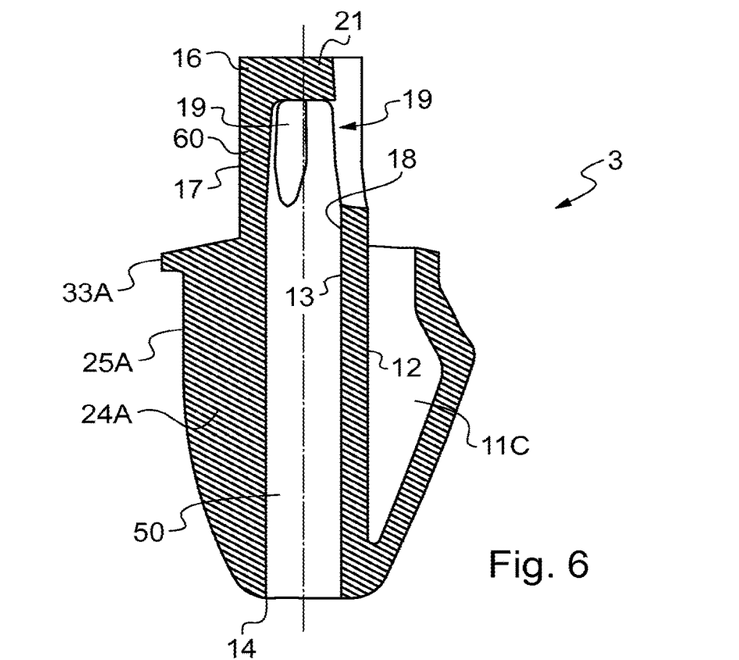
FIG. 6 is the cross-section view on VI-VI of FIG. 3.

It will furthermore be noted that the end edges 25A, 25B and 25C of the small walls 24A, 24B and 24C are parallel to the axial direction of the core 10 in the portion situated substantially between the inflection plane 30 and the transverse edges 29A, 29B and 29C, whereas in the portion situated substantially between that inflection plane 30 and the free end 15 of the snap-engagement foot 3, those end edges 25A, 25B and 25C are curved with a slant relative to the axial direction which is similar to that of the outside surface of the snap-engagement foot 3 (see more particularly FIG. 6).

As can be seen in FIGS. 6 to 9, the part of each of the wings 11A, 11B and 11C that is situated between the pointed end 15 of the snap-engagement foot 3 and the inflection plane 30 is, in the section planes of those Figures, of variable thickness. The same applies for any axial plane over practically the entirety of its circumferential direction.

A similar observation applies for the part of each of the wings 11A, 11B and 11C situated between the infection plane 30 and the transverse edge 29A, 29B and 29C.

Certain details of the wing 11A will now be described, it being understood that its description also applies for the wing 11B and for the wing 11C, on condition of replacing the suffix A of the numerical references with the suffix B, and respectively C.

Figure 5:
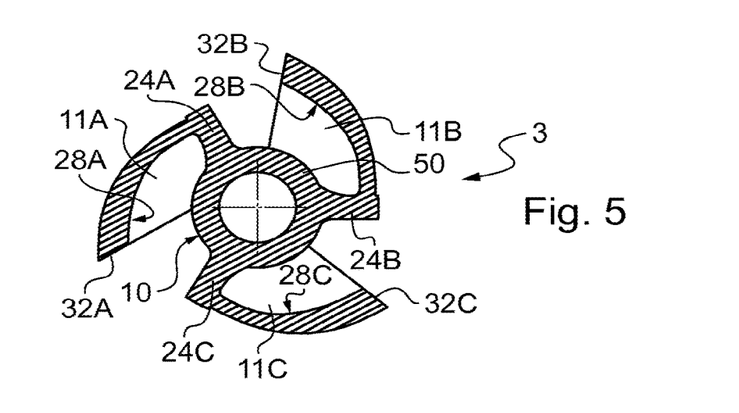

The part of the wing 11A situated between the inflection plane 30 and the pointed end 15 of the snap-engagement foot 3 is of greater thickness along the longitudinal edge 32A of the that wing 11A than along the inside face 27A of the small wall 24A, the thickness in fact decreasing regularly towards that inside face 27A as can be seen in FIG. 5.

It will be noted that the same applies for the part of the wing 11A situated between the inflection plane 30 and the transverse edge 29A (see FIG. 4), and that furthermore the thickness of the wing 11A adjacent the inside face 27A is substantially similar to the transverse edge 29A at the pointed end 15, whereas the thickness of the wing 11A adjacent its longitudinal edge 32A is greater between the inflection plane 30 and the transverse edge 29A between the inflection plane 30 and the pointed end 15, with a maximum thickness in the immediate vicinity of the inflection plane 30 (FIG. 2).

The snap-engagement foot 3 is furthermore provided with three rims 33A, 33B and 33C which each extend radially from one end of a respective small wall 24A, 24G and 24C, which end faces the collar 7 of the engagement head 2, and from the respective transverse edge 29A, 29B and 29C of the respective curved flexible wing 11A, 11B and 11C bordered by the respective small wall 24A, 24B and 24C.

As will be seen below, each rim 33A, 33B and 33C is configured to avoid the pushing-in of the snap-engagement foot 3 beyond the curved flexible wings 11A, 11B and 11C.

The rims 33A, 33B and 33C thus extend from the small walls 24A, 24B and 24C and from the wings 11A, 11B and 11C so as to jut from the end edges 25A, 25B and 25C of the small walls 24A, 24B and 24C and from the outside surfaces of the wings 11A, 11B and 11C.

It will be noted that the rims 33A, 33B and 33C each comprise a respective cut-out 34A, 34B and 34C at a respective end of the rim that is remote from the respective small wall 24A, 24B and 24C from which that respective rim 33A, 33B and 33C extends.

These cut-outs 34A, 34B and 34C thus each form a shoulder on the respective rim 33A, 33B and 33C and are each formed such that their respective rims arrive substantially flush with the respective transverse edge 29A, 29B and 29C, or even interrupt the respective rim 33A, 33B and 33C.

It will be noted that each of the cut-outs 34A, 34B and 34C is formed at a distance from the end of the respective rim 33A, 33B and 33C that is remote from the respective small wall 24A, 24B and 24C from which that rim extends, and that those distances are different from each other.

In the illustrated example, the cut-outs 34A, 34B and 34C are thus of different lengths and in particular, the cut-out 34A is smaller than the cut-out 34B which is itself smaller than the cut-out 34C (see FIG. 3).

The cut-outs 34A, 34B and 34C come from the molding of the first part of the fastener 1 and more specifically of its snap-engagement foot 3.

The insert 16 of the engagement head 2 will now be described in more detail.

This insert 16 is formed in one piece with the core 10 of the snap-engagement foot 3 to form the first part of the fastener 1.

This insert 16 forms an extension of that core 10 in the axial direction of the snap-engagement foot 3.

Thus, the insert 16 extends from the opposite end of the core 10 to the free end 14 of that core 10.

The insert 16 is provided with a hollow cylindrical mast 60 as an extension of the hub 50 of the core 10.

This mast 60 has an outside face 17 and an inside face 18 which are each of cylindrical shape.

It will be noted (see FIGS. 6 to 9) that the hollow mast 60 of the insert 16 is of a thickness (defined between its outside face 17 and its inside face 18) which increases slightly towards a free end 20 of the insert 16.

The free end 20 of the insert 16 is an opposite end to the free end 14 of the core 10.

The insert 16 is furthermore provided with three similar notches 19 formed in the hollow mast 60 and each opening through the outside and inside faces 17, 18.

Each notch 19 furthermore opens at the free end 20 of that insert 16.

These notches 19 each have a U-shaped contour of which the branches extend in the axial direction of the snap-engagement foot 3.

The branches of the U are relatively long, in other words the notches 19 extend over a major part of the length of the insert 16.

In the vicinity of its free end 20 the insert 16 further comprises a retaining plug 21 formed inside the hollow mast 60 and consequently obturating the hollow mast 60 at that free end 20 of the insert 16 and partially obturating each notch 19, in the neighborhood of respective openings of the U's.

A description will now be given, in particular with reference to FIGS. 8 and 9, of the cooperation between the first part of the fastener 1 and the second part of the fastener 1, onto which first part the second part is overmolded.

Figure 7:
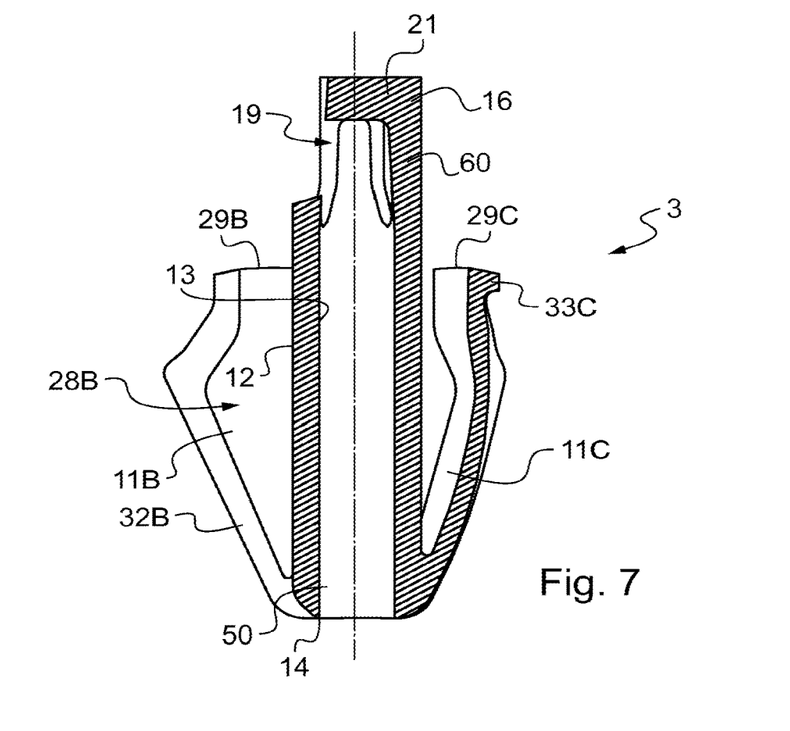
FIG. 7 is the cross-section view on VII-VII of FIGS. 2 and 3.
Figure 9:
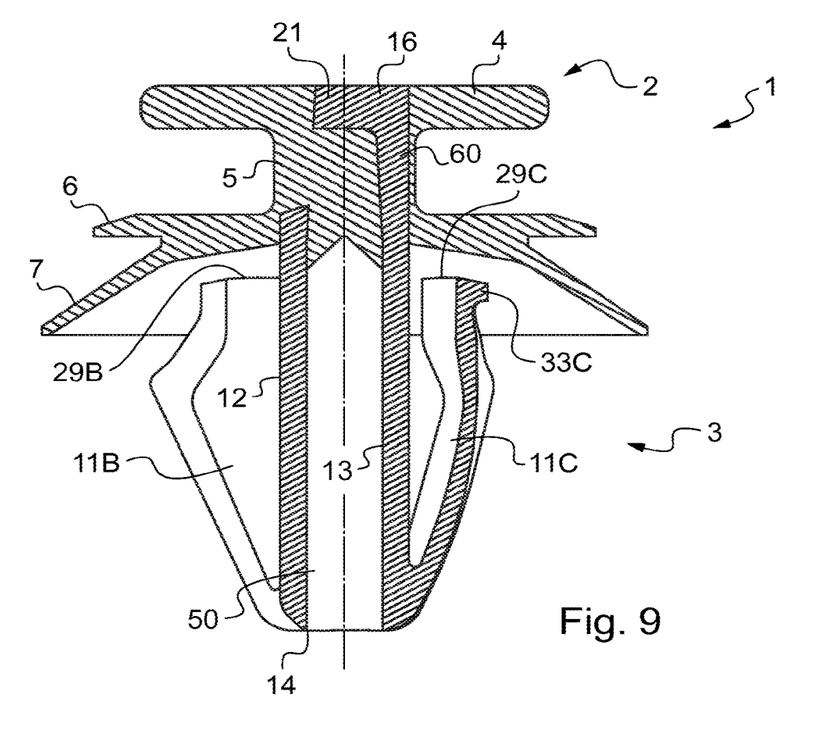

The section planes of FIGS. 8 and 9 are the same as the section planes of FIGS. 6 and 7 apart from the fact that they are made on the basis of FIG. 1 rather than of FIG. 2.

As shown by FIGS. 8 and 9, the first part and the second part of the fastener 1 are each produced from a molded plastics material, which plastics materials are different here.

As stated above, the first part is formed by the snap-engagement foot 3 and the insert 16 of the engagement head 2, whereas the second part is formed from the rest of the engagement head 2, which rest is molded over the insert 16 which extends the core 10 of the snap-engagement foot 3.

The method of molding the one-piece fastener 1, in other words formed from its first and second parts, will be described below.

During the molding of the second part, the plastics material enters the mast 60 of the insert 16 by the notches 19 which are provided therein.

At the location of the flange 4 of the engagement head 2, the second part is overmolded around the free end 20 of the insert 16 and consequently the second part fully or almost fully envelopes the retaining plug 21 of the insert 16, which retaining plug 21 thus makes it possible to strengthen the mechanical anchorage of the second part to the first part.

It will be noted that in the neighborhood of the end 22 of the shank 5, the overmolding face 23 was formed by the molding tool, referred to as a pin, which is inserted into the hub 50 of the core 10, as described below.

It is also to be noted that the plate 6 of the engagement head 2 is disposed around the insert 16 and that the sealing collar 7 of that engagement head 2 comes opposite practically the whole of the part of the snap-engagement foot 3 between the inflection plane 30 and the transverse edges 29A, 29B and 29C.

Figure 10:
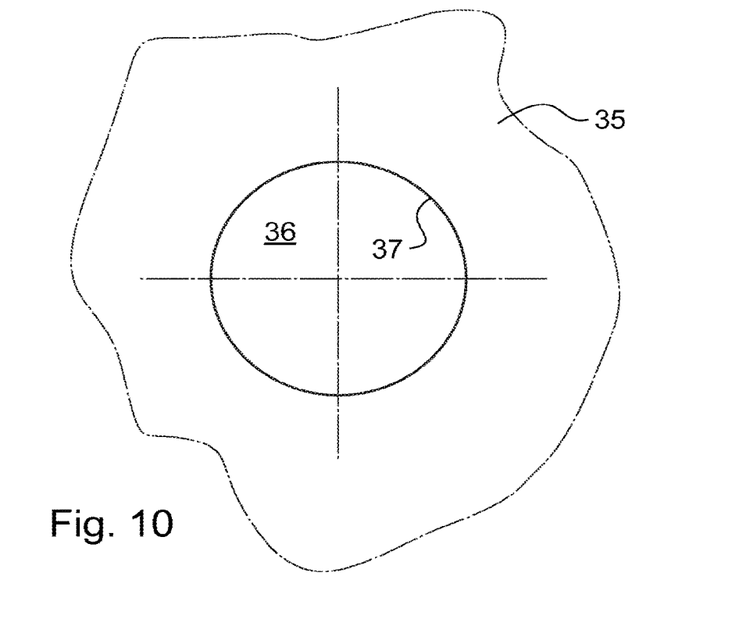
FIG. 10 is a diagrammatic view showing a hole in a panel through which the snap-engagement foot of the fastener is configured to be pushed.

FIG. 10 illustrates a panel 35, to which the fastener 1 is to be fastened, which has a hole 36 of circular contour having a diameter corresponding to the diameter of a circle passing via the end edges 25A, 25B and 25C of the small walls 24A, 24B and 24C, of the part situated between the inflection plane 30 and the rims 33A, 33B and 33C.

The snap-engagement foot 3 is provided to be pushed into the hole 36, end 15 first, the cooperation between the periphery 37 of the hole 36 and the part of the wings 11A, 11B and 11C situated between that end 15 and the inflection plane 30 having the effect of progressively bending the wings 11A, 11B and 11C until that part of the snap-engagement foot 3 has passed through the hole 36, the wings 11A, 11B and 11C then relaxing, the effect of which is to drive the snap-engagement foot 3 in the pushing-in direction until abutment takes place on the face of the panel 35 situated on the side from which the snap-engagement foot 3 was pushed in, as shown in FIG. 11, where the sealing collar 7 is applied against the panel 35.

On account of the small thickness of the sealing collar 7, it is the rims 33A, 33B and 33C of the snap-engagement foot 3 which each form an abutment that causes the pushing-in of the snap-engagement foot 3 to stop since those rims 33A, 33B and 33C come to bear on the panel 35 by their lower face.

It will be noted that the pushing-in of the snap-engagement foot 3 into the hole 36 of the panel 35 is particularly easy since that pushing-in is guided by the end edges 25A, 25B and 25C of the rigid small walls 24A, 24B and 24C which are in immediate proximity, or even in contact, with the periphery 37 of the hole 36 in the panel 35.

It will be noted that in each wing 11A, 11B and 11C, there is more material in the vicinity of the longitudinal edges 32A, 32B and 32C than in the vicinity of the inside faces 27A, 27B and 27C of the small walls 24A, 24B and 24C and that consequently, it is the portion situated in the vicinity of those inside faces 27A, 27B and 27C which deforms, by forming a sort of hinge around which there is a general swinging movement of each wing 11A, 11B and 11C.

Together with the thickness and relatively gentle slant of the part of the wings 11A, 11B and 11C situated between the inflection plane 30 and the pointed end 15, these deformations contribute to making it possible to push in the snap-engagement foot with a relatively moderate force, whereas they contribute, together with the much greater thickness, in particular in the immediate vicinity of the inflection plane 3, and the much steeper slant of the part of the wings 11A, 11B and 11C situated between that inflection plane 30, and the transverse edges 29A, 29B and 29C, to enabling an extraction of the snap-engagement foot 3 with a relatively high force of retention in the hole 36.

As can be seen in FIGS. 3 to 7, each of the wings 11A, 11B and 11C extends, in the circumferential direction, counterclockwise from the respective small wall 24A, 24B and 24C to the respective longitudinal edge 32A, 32B and 32C, as viewed from the engagement head 2.

Thus, if the operator turns the fastener slightly clockwise when he pushes the snap-engagement foot 3 into the hole 36 of the panel 35, this facilitates the pushing-in movement.

It should be noted that to oppose an extraction force, the fastener 1 here acts on the panel 35 with the three wings 11A, 11B and 11C. The pressure experienced by the panel 35 is thus locally relatively low and consequently, the risks of deformation of the panel 35 are reduced. The fastener 1 may thus be used with a relatively thin sheet of metal, for example of 0.6 mm.

Furthermore, the deformation of the snap-engagement foot 3 is distributed over the three wings 11A, 11B and 11C. Consequently, the stresses experienced by each of the wings 11A, 11B and 11C are relatively moderate. The risk of degradation of these wings 11A, 11B and 11C is thus limited.

It will also be noted that with a snap-engagement foot 3 comprising three rigid small walls 24A, 24B and 24C, the wedging action in relation to the hole 36 of the panel 35 is well distributed.

The fact that the end edges 25A, 25B and 25C of the small walls 24A, 24B and 24C are in abutment, or almost, against the periphery 37 of the hole 36 of the panel 35 gives better guidance and better holding of the snap-engagement foot 3 in the panel 35, and consequently a more stable fastener 1.

The method of molding the fastener 1 illustrated here will now be succinctly described.

The snap-engagement foot 3 and the insert 16 of the engagement head 2, in other words the first part, are first of all molded in one piece then the rest of the engagement head 2, in other words the second part, is overmolded onto that first part and more specifically onto the insert 16; to form a one-piece fastener 1 comprising an engagement head 2 and a snap-engagement foot 3

It should be noted that in the fastener 1, it is the wings of the snap-engagement foot 3 that undergo the greatest deformations. It is thus possible to use a plastics material having a lower deformation capacity for the second part than the plastics material used for the first part.

For the molding of the first part, a mold is used comprising a fixed part, a movable pin and two movable slides.

On removal from the mold, the pin is withdrawn from the interior of the mast 60 of the insert 16 and from the hub 50 of the core 10, the two movable slides are driven away from the wings 11A, 11 and 11C and the first part formed from the snap-engagement foot 3 and the insert 16 is ejected axially from the fixed part.

It should be noted that the cut-outs 34A, 34B and 34C from the rims 33A, 33B and 33C are formed by the two movable slides.

It should be noted that the ejection from the first part is achieved thanks to a bending of the wings 11A, 11B and 11C outwardly relative to their resting position and this is moreover in principle the only time at which the wings work in this way, since subsequently the wings 11A, 11B and 11C are configured to bend from their resting position towards the core 10, in particular towards its hub 50.

It is also to be noted that the ejection of the first part is possible on account of the fact that nothing, not even the insert 16, overhangs the wings 11A, 11B and 11C.

By this molding, the snap-engagement foot 3 is thus obtained with the insert 16 forming the first part of the fastener 1 as illustrated in FIG. 2.

This first part of the fastener 1 so formed in a first molded plastics material is then placed on a rod of another mold for the overmolding of the rest of the engagement head 2 (the second part of the fastener 1) onto the first part and more specifically onto the insert 16.

It is to be noted that no angular indexing of the first part relative to the rod is necessary since the inside faces 13 and 18 respectively of the hub 50 of the core 10 and of the mast 60 of the insert 16 are of cylindrical shape.

The rod belongs to the fixed part of the other mold, which further comprises two movable slides.

On removal from the mold, the two movable slides withdraw and the one-piece fastener 1 (first and second parts) so formed is ejected axially from the rod.

Thus, the rest of the engagement head 2 is produced from a second plastics material, here different from the first plastics material, and consequently the engagement head 2 is of two materials since its insert 16 is formed from the first plastics material.

Figure 12:
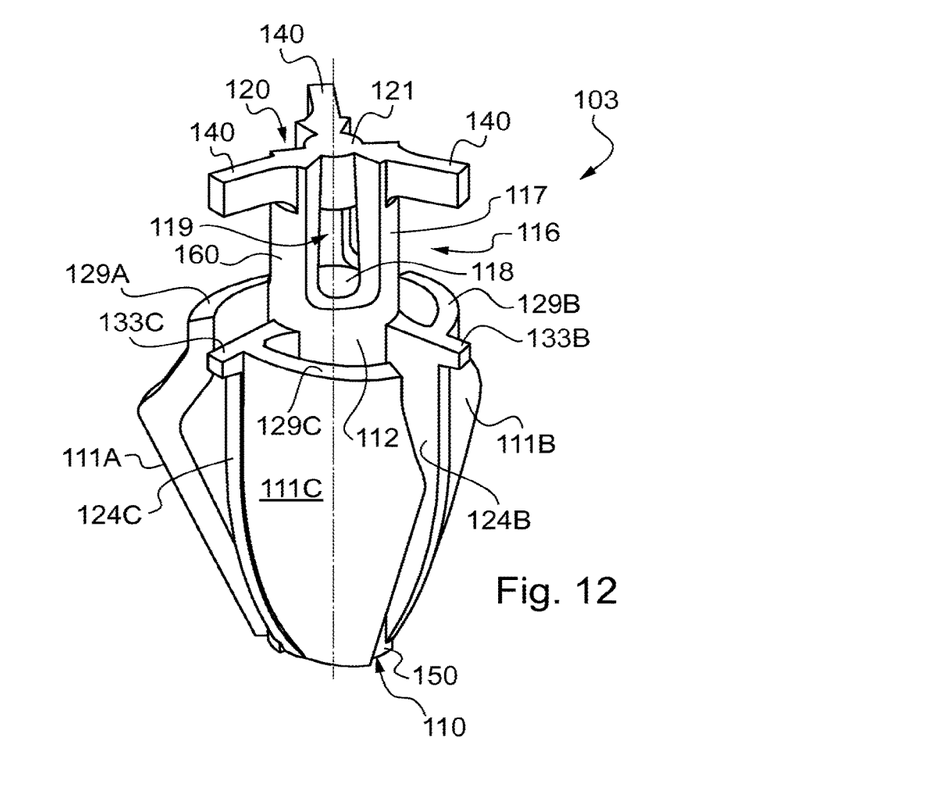
FIG. 12 is a similar view to FIG. 2, but for part of a variant of the fastener of FIG. 1.

FIG. 12 illustrates the first part of a variant embodiment of the fastener 1 illustrated in FIG. 2.

Generally, for similar parts the same references have been used, to which the number 100 has been added.

The first part of the fastener illustrated in FIG. 12 is very similar to the first part of the fastener illustrated in FIG. 2.

This first part comprises a snap-engagement foot 103 which is provided with a rigid core 110 extending in an axial direction, with an insert 116 extending that core 110, with three small walls 124B and 124C from each of which extends a respective wing 111A, 111B and 111C (the small wall from which extends the wing 111A is not visible in FIG. 12).

The rigid core 110 differs from the core 10 in that its hub 150 has an outside face 112 of cylindrical shape and an inside face which is prism-shaped.

The insert 116 differs from the insert 16 in that its mast 160 has its outside face 117 and its inside face 118 similar to the outside face 112 and to the inside face of the hub 150 of the core 110 and in that it has three reinforcing arms 140 extending transversely in the axial direction of the snap-engagement foot 103, in the neighborhood of the free end 120 of that insert 116 and facing the retaining plug 121, which obturates the insert 116 and also partially the notches 119 in the neighborhood of that free end 120.

The second part (not shown) forming the rest of the engagement head thus envelopes the reinforcing arms 140. The mechanical anchorage between the first part and the second part is thus very powerful.

The three rims, only two of which are visible i.e. the rims 133B and 133C (the rim projecting from the small wall that is not visible is not visible either in FIG. 12), differ from the rims 33A, 33B and 33C in that they are shorter since those rims 133B and 133C only extend from the upper end of the respective small walls and thus only jut from the end edges thereof. In other words, those rims do not extend from the transverse edges 129A, 129B and 129C of the wings and consequently do not jut from the outside surfaces of the wings.

In variants that are not illustrated:
 the appendage forming the insert is formed with the second part rather than with the first part of the fastener, and it is thus this first part, formed here from the rest of the snap-engagement foot, which is overmolded onto the second part; that appendage for example extends the shank of the engagement head and at the location of the hub of the core of the snap-engagement foot, and the rest of the snap-engagement foot envelops that appendage or is bonded onto that appendage by virtue of chemical adhesion; for example at an opposite end to the flange, that appendage has an anchorage member of substantially marine anchor shape which projects outside the rest of the snap-engagement foot, in the neighborhood of the pointed end of the snap-engagement foot;
 the first part and the second part of the fastener are produced from the same plastics material;
 the fastener is not provided with three wings, but with a greater number instead, for example four wings, and the core of that fastener comprises as many small walls as wings;
 the core does not have an outside face of cylindrical shape, but which is prism-shaped instead, for example of triangular cross-section; and/or
 the fastener does not comprise an engagement head as illustrated here in the drawings, but instead a different engagement head, for example such as described in French patent application FR 2 872 556, which head is of self-centering type and comprises one or more deformable members extending from a central hub, that deformable member or members being free at their ends or joined to that hub.

Figure 13:
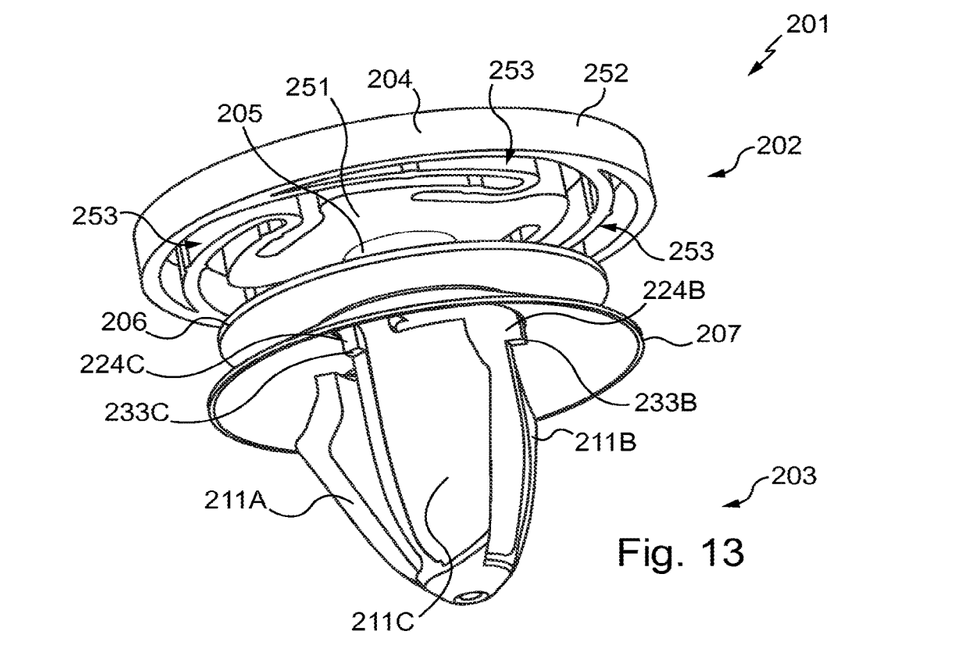
FIG. 13 is a perspective view of a second variant of the fastener according to the invention.
Figure 14:
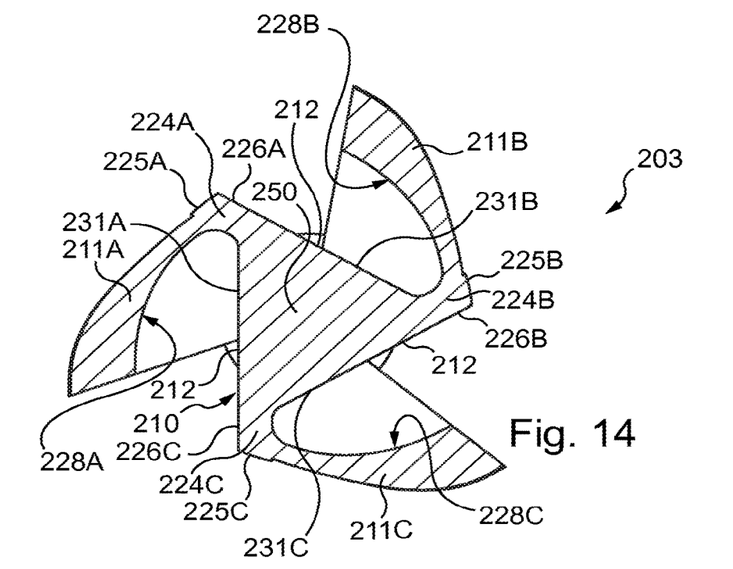
FIG. 14 is a view of a cross-section through the foot of the fastener shown in FIG. 13.

A second variant embodiment of the fastener 1 will now be described with the aid of FIGS. 13 and 14.

Generally, for similar parts the same references have been used, to which the number 200 has been added.

The fastener 201 implements the variants just referred to, i.e. the core 210 not having an outside face of cylindrical shape, but being prism-shaped, here of triangular cross-section (FIG. 14); whereas the engagement head 202 is of the type described in French patent application FR 2 872 566.

The engagement head 202 comprises a plate 206, a sealing collar 207, a solid shank 205 and a flange 204.

The flange 204 is of the self-centering type and comprises a central rigid hub 251, a rigid peripheral rim 252 and four flexible arms 253 (of which only three are visible) linking the hub 251 to the rim 252.

The flange 204 is connected to the shank 205 by the hub 251.

The snap-engagement foot 203 comprises a rigid core 210 which is star-shaped in cross-section. The core 210 comprises a hub 250, which is solid here, and three small walls 224A, 224B and 224C each disposed at a vertex of the hub 250.

The hub 250 has three flat faces 231A, 231B and 231C.

The small walls 224A, 224B and 224C respectively comprise an end edge 225A, 225B and 225C and a straight outside face 226A, 226B and 226C. The curved wings 211A, 211B and 211C extend respectively from the small walls 224A, 224B and 224C.

The conformation of the small walls 224A, 224B and 224C is such that their straight outside face 226A, 226B and 226C is in line respectively with the flat faces 231B, 231C and 231A of the hub 250.

Thus, the association of a straight outside face of a small wall and a flat face of the hub together form an entirely flat outside face 212 of the rigid core 210.

The rigid core 210 thus has three outside faces 212 faced respectively by the inside surface 228A, 228B and 228C of the wing 211A, 211B and 211C.

The method of molding the fastener 201 will now be described.

The fastener 201 is molded in one piece in a single step; in other words the engagement head 202 and the snap-engagement foot 203 are integrally molded in the same mold. The fastener 201 is of a single material.

To mold the snap-engagement foot 203, a mold comprising three movable slides is used, each movable slide corresponding to one of the wings of the foot.

It will be noted that the movable slides, just like the small walls 224A, 224B, and 224C, are offset from each other by 120°.

On removal from the mold, the three movable slides are driven away from the wings 211A, 211B and 211C in order for the foot 203, and thus the fastener 201, to be able to be ejected.

In this embodiment, the fact of having the outside faces 212 flat, enables the withdrawal of the slides and thus to mold the fastener 201 in a single step.

As regards the engagement head 202, the plate 6 and the sealing collar 7 are removed from the mold by force.

A third variant embodiment of the fastener 1 will now be described with the aid of FIGS. 15 and 16.

Figure 16:
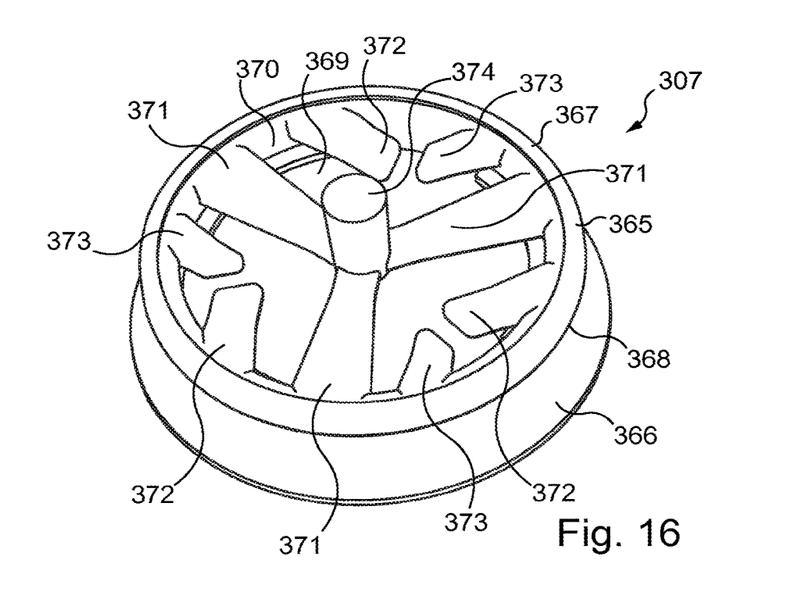
FIG. 16 is a perspective view of the collar of the third variant of the fastener according to the invention.

The fastener 301 is identical to the fastener 201, except that it comprises an engagement head 302 comprising a shank 305, a plate 306 and a sealing collar 307 (FIG. 16).

Figure 15:
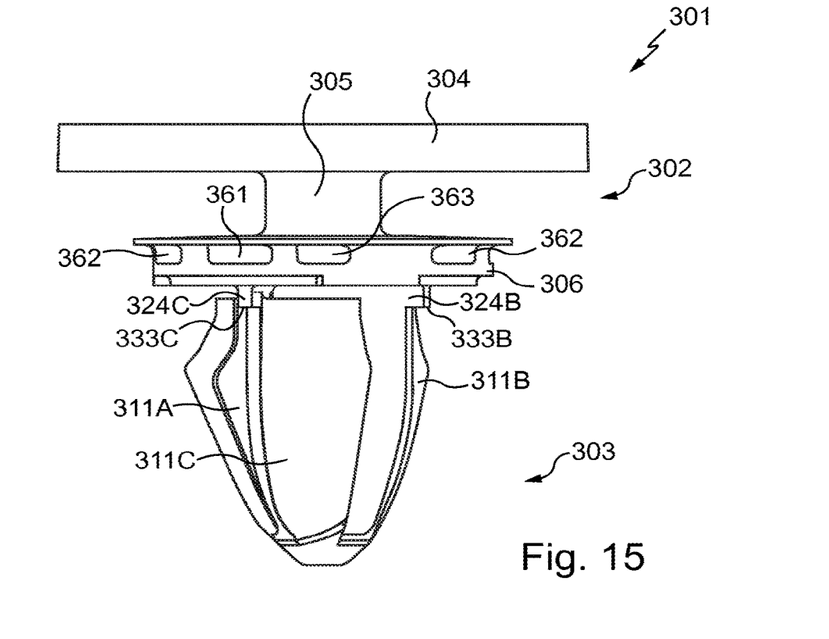
FIG. 15 is a view in elevation of a first part of a third variant of the fastener according to the invention, similar to the second variant but with the collar made from a different plastics material.

The shank 305, illustrated in FIG. 15, is cylindrical has an internal cavity (not shown).

The plate 306 is cylindrical and comprises nine recesses (only four of which are visible in FIG. 15) formed within its thickness.

The nine recesses are evenly spaced in sets of three along the periphery of the plate 306.

Each set of recesses comprises a central recess 361 and two lateral recesses 362 and 363 respectively disposed to the left and to the right of the central recess 361.

The sets of three recesses are situated on the periphery of the plate 6 such that each central recess 361 of each set of recesses is vertically aligned with one of the small walls of the snap-engagement foot 303. As can be seen in FIG. 15, for the curved wing 311C, there is a set of three recesses 361, 362 and 363 formed in the plate 306 above that wing.

It can be noted that in FIG. 15 the lateral recess 362 belonging to the set of recesses of the wing 311B is also visible.

As described earlier, three movable slides are used in order to mold the wings 311A, 311B and 311C of the foot 303. To produce the recesses of the plate 306, each of these three movable slides comprises a trident, with the central spike being longer than the two lateral spikes, configured to form a set of three recesses 361, 362 and 363.

Each set of recesses is thus oriented in the direction of movement of one of the three slides used to mold the wings 311A, 311B and 311C, that is to say parallel to one of the flat faces of the rigid core.

FIG. 16 illustrates, in isolation, a sealing collar 307 with is overmolded onto the fastener 301 and more specifically onto the plate 306.

The collar 307 once molded will now be described in more detail.

The collar 307 comprises a crown 365 and a skirt 366.

The crown 365 has a first face 367 and an opposite second face.

The crown 365 furthermore has an inside space 369 delimited by an inside surface 370.

From that inside surface 370 project nine arms all directed towards the inside space 369. These nine arms are grouped together into sets of three and these sets are regularly spaced around the inside surface 370.

Each set of three arms comprises a central arm 371 and two lateral arms 372 and 373 respectively disposed to the left and right of the central arm 371.

It is to be noted that in each set of three arms, the lateral arm 372 is longer than the lateral arm 373.

The three central arms 371 meet at the center of the inside space 369 via a nipple 374 extending transversely to the crown 365.

The crown 365 and the skirt 366 are assembled such that the skirt 366 extends from the second face 368 of the crown 365.

Each set of arms is formed during the molding by a set of recesses in the plate 306 while the nipple 374 is formed by the internal cavity of the shank 205 once the collar 307 has been overmolded onto the plate 306.

Thus, for each set of arms, the central arm 371 is formed by the recess 361, the lateral arm 372 is formed by the recess 362 and the lateral arm 373 is formed by the recess 363 of the corresponding set of recesses.

It will be noted that when the collar 307 is overmolded onto the plate 306, the latter fills the internal space 369.

The collar 307 may be made using the same material as the engagement head 302 and the snap-engagement foot 303, and the fastener is then said to be a mono-material fastener, or with a different material, and the fastener is then said to be a bi-material fastener.

For example, the head and the foot may be molded in polyoxymethylene, known under the name POM, and the collar of thermoplastic elastomer, known under the name TPE.

Of course, numerous other variants are possible according to circumstances, and in this connection it is to be noted that the invention is not limited to the examples described and shown.

The invention claimed is:

1. A fastener comprising a snap-engagement foot configured to be pushed axially through a hole in a panel and an engagement head configured to jut over said panel when said snap-engagement foot is pushed into said hole, which snap-engagement foot comprises a rigid core and two curved flexible wings each connected to said rigid core along one side, each said curved flexible wing having, opposite a face of said core, an inside surface bordered by a longitudinal edge of said wing and by a transverse edge of said wing in face-to-face relationship with said engagement head; said snap-engagement foot having an outside surface tapering respectively towards a pointed end that is an opposite end to said engagement head and towards said transverse edge of each said wing, on respective opposite sides of an inflection plane oriented transversely to the axial direction of said snap-engagement foot; each said curved flexible wing being configured to bend by elastic deformation towards said rigid core to enable the snap engagement of said foot into said hole; wherein said rigid core comprises a hub and three small walls extending radially from said hub, and said fastener further comprises a third curved flexible wing similar to the other two curved flexible wings, said inside surface of each said curved flexible wing being furthermore bordered by a said respective small wall which is remotely opposite said longitudinal edge of said wing.

2. A fastener according to claim 1, wherein said small walls are regularly distributed along a periphery of said hub.

3. A fastener according to claim 1, wherein said snap-engagement foot has at least one rim separate from the small walls extending radially outward at the location of an end of a said small wall opposite said engagement head and at the location of said transverse edge of said curved flexible wing bordered by said small wall, said rim being configured to avoid the pushing-in of said snap-engagement foot when the snap-engagement foot is inserted in said hole beyond said curved flexible wings.

4. A fastener according to claim 3, wherein: said at least one rim is provided with a cut-out at an end of said rim that is an opposite end to small wall from which said rim extends.

5. A fastener according to claim 4, wherein said snap-engagement foot comprises the same number of said rims as the number of said wings or said small walls, and each said rim has a said cut-out and said cut-outs are of different lengths.

6. A fastener according to claim 1, wherein said engagement head is configured to be pushed axially through a key-hole shaped opening in a trim member and is provided with a flange, with a plate configured to avoid the pushing-in of said engagement head into said key-hole shaped opening beyond said plate during axially pushing of said engagement head through the key-hole shaped opening, with a shank interposed between said flange and said plate and defining a space configured to receive said trim member during axially pushing of said engagement head through the key-hole shaped opening, and a collar, said plate being interposed between said collar and said shank.

7. A fastener according to claim 6, wherein said engagement head further comprises an anchorage face at an opposite end to said flange, which anchorage face is surrounded by an insert of said engagement head.

8. A fastener according to claim 1, wherein said hub of said rigid core has an inside face which is of cylindrical shape.

9. A fastener according to claim 1, wherein said hub of said rigid core has an inside face which is prism-shaped.

10. A fastener according to claim 1, wherein said engagement head is provided with an insert and said fastener comprises a first part formed from said snap-engagement foot and from said insert, which insert is made as a single part with said snap-engagement foot, and a second part formed from the remainder of said engagement head, which second part is overmolded onto said insert, said insert forming an extension to said snap-engagement foot without overhanging any of said curved flexible wings.

11. A fastener according to claim 10, wherein said first part is formed from a first plastics material and said second part is formed from a second plastics material different from said first plastics material.

12. A fastener according to claim 10, wherein said insert projects from said rigid core.

13. A fastener according to claim 12, wherein said insert is in the form of a hollow mast provided with at least one notch opening at a free end of said hollow mast.

14. A fastener according to claim 13, wherein said insert is provided with a retaining plug formed at the location of said free end of said hollow mast to obturate at least partially said hollow mast and said at least one notch.

15. A fastener according to claim 14, wherein said engagement head further comprises an anchorage face at an opposite end to said flange, which anchorage face is surrounded by an insert of said engagement head.

16. A fastener according to claim 10, wherein said insert has at least one reinforcing arm extending transversely to the axial direction of said snap-engagement foot, which reinforcing arm is enveloped by said second part of said fastener.

17. A fastener according to claim 1, wherein said hub comprises a flat face, facing each curved wing, each said small wall comprising between its end edge and said hub a straight outside wall in line with a said flat face of said hub, each said face of said rigid core faced by a said wing being flat and formed by a said flat face of said hub and a said straight outside face of a said small wall.

18. A fastener according to claim 17, wherein it is entirely formed from the same plastic.

19. A fastener according to claim 17, wherein said engagement head is configured to be pushed axially through a key-hole shaped opening in a trim member and comprises a plate configured to avoid the pushing-in of said engagement head into said opening beyond said plate and also a collar; said collar being formed from a different plastics material from the rest of the fastener.

20. A fastener according to claim 19, wherein said plate comprises recesses for arms of the collar.

21. A fastener according to claim 20, wherein said recesses and said arms are grouped together in the same number of sets as there are said flexible wings, the recesses and the arms of each set being oriented in a direction parallel to one of said flat faces of said rigid core.

22. A fastener according to claim 1, wherein:
the respective wings extend from the respective three small walls, and the respective wings extend from the respective three small walls in an abrupt manner.

23. A fastener according to claim 1, wherein:
with respect to a cross-section through a longitudinal axis of the fastener, the respective three small walls have respective straight sections for at least substantially the entire distance from the core.

24. A fastener, comprising:
a snap-engagement foot configured to be pushed axially through a hole in a panel; and
and an engagement head configured to jut over said panel when said snap-engagement foot is pushed into said hole, wherein
the snap-engagement foot includes:
a rigid core; and
three curved flexible wings each connected to said rigid core at different angular locations on the core about an axis of the core, each said curved flexible wing having, opposite a face of said core, an inside surface bordered by a longitudinal edge of said wing and by a transverse edge of said wing,
the snap-engagement foot includes a pointed end that is an opposite end to said engagement head, and each wing includes an outside surface tapering respectively towards: (i) the pointed end, and (ii) the transverse edge, on respective opposite sides of an inflection plane oriented transversely to the axial direction of said snap-engagement foot, the inflection plane being defined by respective inflection points of the respective outside surfaces, each of said curved flexible wings being configured to bend by elastic deformation towards said rigid core to enable the snap engagement of said foot into the hole when inserted therein, wherein said rigid core comprises a hub and three small walls extending radially from said hub, the respective inside surfaces of each said curved flexible wing being furthermore bordered respectively by the small walls which are remotely opposite the respective longitudinal edges of the respective wings.

25. The fastener of claim 24, wherein:
the rigid core is star-shaped in cross-section.

26. A fastener according to claim 24, wherein said snap-engagement foot has at least one rim separate from the small walls extending radially outward at the location of an end of a said small wall opposite said engagement head and at the location of said transverse edge of said curved flexible wing bordered by said small wall, said rim being configured to avoid the pushing-in of said snap-engagement foot in said hole beyond said curved flexible wings.

27. A fastener according to claim 24, wherein said engagement head is configured to be pushed axially through a key-hole shaped opening in a trim member and is provided with a flange, with a plate configured to avoid the pushing-in of said engagement head into said key-hole shaped opening beyond said plate during axially pushing of said engagement head through the key-hole shaped opening, with a shank interposed between said flange and said plate and defining a space configured to receive said trim member during axially pushing of said engagement head through the key-hole shaped opening, and a collar, said plate being interposed between said collar and said shank.

28. A fastener according to claim 24, wherein said engagement head is provided with an insert and said fastener comprises a first part formed from said snap-engagement foot and from said insert, which insert is made as a single part with said snap-engagement foot, and a second part formed from the remainder of said engagement head, which second part is overmolded onto said insert, said insert forming an extension to said snap-engagement foot without overhanging any of said curved flexible wings.

29. A fastener according to claim 24, wherein:
the respective three small walls are respectively distinct from the respective three wings.

30. A fastener according to claim 24, wherein:
the respective three small walls extend in a constant direction away from a longitudinal axis of the fastener.

31. A fastener according to claim 24, wherein:
the respective three small walls have respective sections that extend in respectively straight directions.

32. A fastener according to claim 24, wherein:
the respective three small walls have respective first directions of extension, with respect to location relative to a longitudinal axis of the fastener, and the three wings have respective second directions of extension of the wings from the three small walls, wherein the respective angles between the first directions and the second directions are at least right angles.

33. A fastener, comprising:
a snap-engagement foot configured to be pushed axially through a hole in a panel; and and an engagement head configured to jut over said panel when said snap-engagement foot is pushed into said hole, wherein the snap-engagement foot includes:
a rigid core; and
three curved flexible wings each connected to said rigid core at different locations on the core, each said curved flexible wing having, opposite a face of said core, an inside surface bordered by a longitudinal edge of said wing and by a transverse edge of said wing, the snap-engagement foot includes a pointed end that is an opposite end to said engagement head, and each wing includes an outside surface tapering respectively towards: (i) the pointed end, and (ii) the transverse edge, on respective opposite sides of an inflection plane oriented transversely to the axial direction of said snap-engagement foot, the inflection plane being defined by respective inflection points of the respective outside surfaces, each of said curved flexible wings being configured to bend by elastic deformation towards said rigid core to enable the snap engagement of said foot into the hole when inserted therein, wherein said rigid core comprises a hub and three small walls extending radially from said hub, the respective inside surfaces of each said curved flexible wing being furthermore bordered respectively by the small walls which are remotely opposite the respective longitudinal edges of the respective wings.

* * * * *